Patented Oct. 11, 1932

1,882,517

UNITED STATES PATENT OFFICE

MORITZ NEUMARK, OF HERRENWYK IN LUBECKSCHEN, AND HANS WEIDMANN AND GERHARD ROESNER, OF FRANKFORT-ON-THE-MAIN, GERMANY, ASSIGNORS TO AMERICAN LURGI CORPORATION, OF NEW YORK, N. Y., A CORPORATION OF NEW YORK

PROCESS FOR THE PRODUCTION OF FERRO-PHOSPHORUS LOW IN OR PRACTICALLY FREE FROM SILICON

No Drawing. Application filed March 7, 1931, Serial No. 521,002, and in Germany March 13, 1930.

This invention relates to a process for the production of ferro-phosphorus low in or practically free from silicon.

In the arts, ferro-phosphorus is usually obtained as a by-product of the thermal process of producing phosphorus by heating mineral phosphates, such as tri-calcium phosphate, in association with reducing agents, such as carbon, in which operation an amount of phosphorus corresponding to the iron present is converted into ferro-phosphorus. The reaction is generally effected in the electric furnace at very high temperatures, the additions being employed in such proportion that an acid charge is obtained, which contains more than 1 molecule of silica to each molecule of lime. The presence of silica in excess is to facilitate the expulsion of the phosphorus, inasmuch as the phosphorus pentoxide liberated from the raw phosphate by the silica—which is not volatile at the high temperature of the furnace—is more readily reduced by the carbon than is the case with the (for example neutral) phosphate employed as the originating material.

It has also been proposed to heat a mixture of finely divided mineral phosphate, carbon and an excess of silica, in a rotary tube furnace to which air is admitted, the proportions of the mixture being such that more than 1 molecule of silica is present to each molecule of lime or magnesia. The excess of silica to be employed is, for example, 10% above the calculated quantity for the bases present, its purpose, in this case also, being to liberate phosphorus pentoxide, which is then reduced at once to elementary phosphorus by the reducing carbon.

However, the ferro-phosphorus produced in this manner, in an acid charge, always contains large amounts of silicon and also titanium, which impurities are, in many cases, undesirable in connection with the further treatment of the product for the production of special alloys or chemical compounds. The silicon content is particularly troublesome, for example in the production of alkali phosphate by heating the ferro-phosphorus with alkali salts, inasmuch as, in leaching the reaction product, the silicon passes into solution as waterglass, and thus greatly impedes the filtration of the contaminated liquor, whilst at the same time a quantity of alkali, corresponding to the amount of silicon, is wasted.

In designed deliberate contrast to these known processes, based on the employment of a decidedly acid charge, the process of the present invention effects the reaction by means of a furnace charge which is at least neutral, and preferably decidedly basic, and which contains, if any, no substantial amounts of alumina. The charge used according to the present invention comprises a phosphate such as tri-calcium phosphate, a reducing agent such as carbon and iron and/or ferruginous substances in quantities sufficient for combining with the phosphorus set free from the phosphates, there being present in the charge not more, and preferably less, of total free and combined silica than the corresponding total equivalent quantity of free and combined bases (i. e. for example not more than one molecule of silica to each molecule of lime), the reaction being carried out at temperatures not exceeding 1650° C.

The hereindescribed process is confined to the employment of phosphates or furnace charges which do not contain substantial amounts of alumina. Any alumina present incidentally in the charge is calculated as silica based on the ratio: 1 molecule of $Al_2O_3$ = 1 molecule of $SiO_2$. By operating in the described manner an excellent yield of ferrophosphorus is attained, which with a high phosphorus content—such as over 22%—contains extremely little silicon, if any, and therefore is not attended with any of the inconveniences attaching to the ferro-phosphorus, more or less high in silicon, obtained from an acid charge.

It has been found specially suitable to employ, for carrying out the present process, the coke-fired blast furnace, with which it is easily possible to maintain such conditions of temperature that the reduction temperature of silica is barely attained, and that of titanic acid never attained. By this means, further assistance is given to the restrictive influence of the diminished silica content of the charge on the formation of free silicon and titanium. Nevertheless, any other conveniently heated type of furnace—such as an electric furnace—may, of course, be employed, provided care be taken, by suitable arrangements, or suitable type and amount of current supply, to prevent the working temperatures, recognized as advantageous according to the present invention, from being exceeded.

Maintenance of the prescribed working conditions enables ferro-phosphorus to be obtained which contains only a few hundredths of a per cent of silicon, whereas the products obtained, in the usual manner, with an acid charge in the electric furnace, contain silicon up to and exceeding 15%.

A further advantage of the method of operating according to the present invention consists in that, owing to the diminished amount of slag, the losses incurred through the retention of phosphorus in the slag are lessened and the coke consumption is reduced, whilst the output per unit volume of furnace capacity is higher than in the usual method of operating with charges containing silica in excess.

Example

A 77/76 coronet-pebble-phosphate (with 15.4% of P., 49% of CaO, and 6% of $SiO_2$) is treated in the coke-fired blast furnace. The composition of the charge is as follows:—

| | Kgs. |
|---|---|
| Pebble | 560 |
| Sand | 230 |
| Scrap | 290 |
| Coke | 900 |

The product consists of: ferro-phosphorus (with about 22% of P and Si equivalent to 0.2% of $SiO_2$) 363 kgs., and slag (containing 48% of CaO and 44.1% of $SiO_2$) 490 kgs. The ratio of $SiO_2$ to CaO in the slag is therefore 0.9 : 1.

We claim:

1. A process for the production of ferro-phosphorus low in to free from silicon, which comprising heating to a reducing temperature not exceeding 1650° C. a furnace charge containing in addition to a calcium phosphate, siliceous and ferruginous substances and a carbonaceous material in an amount sufficient to convert both the phosphorus and the iron present in the combined form into elementary phosphorus and metallic iron, but containing no substantial amounts of alumina and the composition of which charge is so controlled that it contains on the whole not more total free and combined $SiO_2$ than is equivalent to the total quantity of free and combined bases.

2. A process for the production of ferro-phosphorus low in to free from silicon, which comprises heating to a reducing temperature not exceeding 1650° C. a furnace charge containing in addition to tricalcium phosphate, siliceous and ferruginous substances and a carbonaceous material in an amount sufficient to convert both the phosphorus and the iron present in the combined form into elementary phosphorus and metallic iron, but containing no substantial amounts of alumina and the composition of which charge is so controlled that it contains on the whole not more total free and combined $SiO_2$ than is equivalent to the total quantity of free and combined bases.

3. A process for the production of ferro-phosphorus low in to free from silicon, which comprises heating to a reducing temperature not exceeding 1650° C., a furnace charge containing in addition to tricalcium phosphate, siliceous substances and metallic iron and a carbonaceous material in an amount sufficient to convert the phosphorus present into elementary phosphorous, but containing no substantial amount of alumina and the composition of which charge is so controlled that it contains on the whole not more total free and combined $SiO_2$ than is equivalent to the total quantity of free and combined bases.

4. A process for the production of ferro-phosphorous low in to free from silicon, which comprises heating to a reducing temperature not exceeding 1650° C. a furnace charge containing in addition to tricalcium phosphate, siliceous substances and ferruginous substances and a carbonaceous material in an amount sufficient to convert both the phosphorus and the iron present in the combined form into elementary phosphorus and metallic iron, but containing no substantial amounts of alumina and the composition of which charge is so controlled that it contains on the whole less total free and combined $SiO_2$ than is equivalent to the total quantity of free and combined bases.

In testimony whereof, we affix our signatures.

MORITZ NEUMARK.
HANS WEIDMANN.
GERHARD ROESNER.